United States Patent
Ni et al.

(10) Patent No.: US 8,830,808 B1
(45) Date of Patent: Sep. 9, 2014

(54) METHOD AND APPARATUS FOR ZERO OFFSET AND GAIN START

(75) Inventors: Bin Ni, Sunnyvale, CA (US); Zachary Keirn, Loveland, CO (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 227 days.

(21) Appl. No.: 12/856,762

(22) Filed: Aug. 16, 2010

Related U.S. Application Data

(60) Provisional application No. 61/241,313, filed on Sep. 10, 2009.

(51) Int. Cl.
*G11B 7/00* (2006.01)

(52) U.S. Cl.
USPC .................. 369/53.35; 369/47.27; 369/47.17

(58) Field of Classification Search
USPC .......... 369/47.15, 47.25, 59.15, 47.17, 47.27, 369/53.13, 53.18, 53.35
See application file for complete search history.

(56) References Cited

U.S. PATENT DOCUMENTS

| | | | | |
|---|---|---|---|---|
| 5,479,264 A | * | 12/1995 | Ueda et al. | 386/317 |
| 6,147,944 A | * | 11/2000 | Kwon et al. | 369/44.32 |
| 6,333,902 B1 | * | 12/2001 | Shim | 369/47.54 |
| 7,161,522 B1 | * | 1/2007 | Altekar et al. | 341/155 |
| 7,463,084 B2 | * | 12/2008 | Hao et al. | 327/553 |
| 2002/0118623 A1 | * | 8/2002 | Ha | 369/53.33 |
| 2003/0026185 A1 | * | 2/2003 | Fujiwara et al. | 369/53.15 |
| 2003/0076761 A1 | * | 4/2003 | Abe et al. | 369/53.32 |
| 2004/0141433 A1 | * | 7/2004 | Yoon et al. | 369/44.26 |
| 2004/0172148 A1 | * | 9/2004 | Horibe | 700/94 |
| 2004/0213123 A1 | * | 10/2004 | Takahashi et al. | 369/59.19 |
| 2005/0117484 A1 | * | 6/2005 | Tatsuzawa et al. | 369/53.15 |
| 2007/0177475 A1 | * | 8/2007 | Kim et al. | 369/53.34 |
| 2007/0280079 A1 | * | 12/2007 | Cheng et al. | 369/59.1 |
| 2007/0280087 A1 | * | 12/2007 | Watanabe et al. | 369/124.1 |

* cited by examiner

*Primary Examiner* — Thomas Alunkal

(57) ABSTRACT

Aspects of the disclosure provide a signal processing circuit. The signal processing circuit includes a processing path and a zero-start module. The processing path is configured to process an electrical signal that is generated in response to reading data on a storage medium. The data includes at least a first field and a second field. The electrical signal has a first profile corresponding to the first field and has a second profile corresponding to the second field. The zero-start module is configured to detect a field change from the first field to the second field, and control the processing path to add a compensation as a function of a profile change from the first profile to the second profile to keep the processed electrical signal to have a predetermined profile in response to the detected field change.

20 Claims, 12 Drawing Sheets

METHOD AND APPARATUS FOR ZERO OFFSET AND GAIN START

INCORPORATION BY REFERENCE

This application claims the benefit of U.S. Provisional Application No. 61/241,313, "Zero Offset and Gain Start" filed on Sep. 10, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a signal processing circuit uses offset and gain control techniques to keep amplitude and offset of a signal to be relatively constant. In an example, an optical storage device includes a read channel that receives an electrical signal corresponding to information on an optical storage medium. The read channel includes an offset control loop to keep an offset of the electrical signal to be relatively constant. In addition, the read channel includes a gain control loop to keep an amplitude of the electrical signal to be relatively constant.

SUMMARY

Aspects of the disclosure can provide a signal processing circuit. The signal processing circuit includes a processing path and a zero-start module. The processing path is configured to process an electrical signal that is generated in response to reading data on a storage medium. The data includes at least a first field and a second field. The electrical signal has a first profile corresponding to the first field and has a second profile corresponding to the second field. The zero-start module is configured to detect a field change from the first field to the second field, and control the processing path to introduce a compensation as a function of a profile change from the first profile to the second profile to keep the processed electrical signal to have a predetermined profile in response to the detected field change.

In an embodiment, the processing path includes an offset control loop configured to adjust an offset of the processed electrical signal in a feedback loop manner. The zero-start module is configured to control the offset control loop to introduce an offset compensation in response to the detected field change as a function of an offset change from the first profile to the second profile. Further, the zero-start module includes an offset estimator configured to estimate the offset change based on at least one of an average and an envelope of the processed electrical signal in response to the field change, and determine the offset compensation as a function of the estimated offset change. In an example, the offset estimator includes a look-up table configured to adjust the average and/or the envelope of the processed electrical signal to compensate for saturation in the processing path.

In addition, the processing path includes a gain control loop configured to adjust an amplitude of the processed electrical signal in a feedback loop manner. Then, the zero-start module controls the gain control loop to introduce a gain compensation in response to the detected field change as a function of an amplitude change from the first profile to the second profile. Further, the zero-start module includes an amplitude estimator configured to estimate an amplitude of the processed electrical signal after the offset compensation is introduced in the offset control loop, and determine the gain compensation as a function of the estimated amplitude.

According to an aspect of the disclosure, the zero-start module further includes a predictor configured to predict the field change based on a data format of the data read from the storage medium. In an example, the predictor is configured to predict the field change based on the data extracted from the processed electrical signal.

Aspects of the disclosure can provide a method for signal processing. The method includes detecting a field change of data read from a first field to a second field on a storage medium. The field change results in a profile change in an electrical signal that is generated in response to the reading. Further, the method includes introducing compensation as a function of the profile change to keep the processed electrical signal to have a predetermined profile in response to the detected field change.

To introduce the compensation as a function of the profile change, the method includes introducing an offset compensation in an offset control loop for processing the electrical signal. The offset compensation is a function of an offset change in the electrical signal in response to the field change. Further, the method includes estimating the offset change in response to the field change based on at least one of an average and an envelope of the processed electrical signal, and determining the offset compensation as a function of the estimated offset change. In an example, the method includes adjusting the average and/or the envelope of the processed electrical signal to compensate for saturation during the signal processing.

Additionally, the method includes introducing a gain compensation in a gain control loop for processing the electrical signal. The gain compensation is a function of an amplitude change of the electrical signal in response to the field change. Similarly, the method includes estimating an amplitude of the processed electrical signal after the offset compensation is introduced in the offset control loop, and determining the gain compensation as a function of the estimated amplitude.

According to an aspect of the disclosure, the method includes predicting the field change based on a data format of the data read from the storage medium. Further, the method includes predicting the field change based on the data extracted from the processed electrical signal.

Aspects of the disclosure can provide an apparatus for accessing a storage medium. The apparatus includes a pick-up unit configured to generate an electrical signal in response to reading data on the storage medium. The data includes at least a first field and a second field. The electrical signal has a first profile corresponding to the first field and has a second profile corresponding to the second field. Further, the apparatus includes a processing path configured to process the electrical signal, and a zero-start module. The zero-start module detects a field change from the first field to the second field, and controls the processing path to introduce a compensation as a function of a profile change from the first profile to the second profile to keep the processed electrical signal to have a predetermined profile in response to the detected field change.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
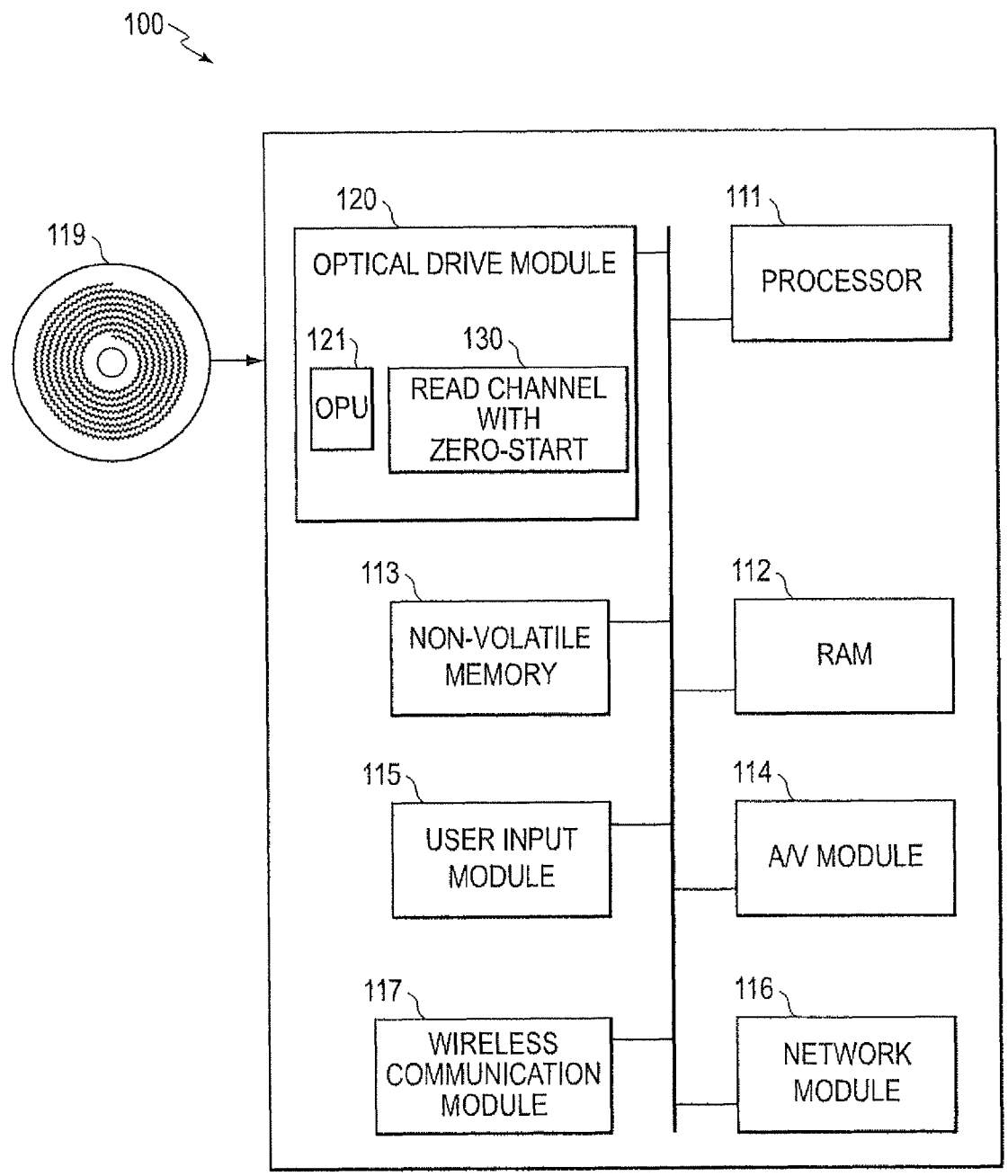
FIG. 1 shows a block diagram of a medium system example 100 and an optical disc example 119 according to an embodiment of the disclosure.

FIG. 1 shows a block diagram of a medium system example 100 and an optical disc example 119 according to an embodiment of the disclosure. The medium system 100 includes a processor 111, an optical drive module 120, random access memory (RAM) 112, and non-volatile memory 113. These elements are coupled together as shown in FIG. 1.

The optical drive module 120 includes an optical pickup unit (OPU) 121, and a read channel 130. The OPU 121 is configured to generate an electrical signal in response to information on the optical disc 119. Specifically, the OPU 121 directs a laser beam to a location of the optical disc 119. The laser beam is reflected from the location of the optical disc 119. The reflected laser beam has light properties that correspond to information stored at the location of the optical disc 119. The light properties can be detected by a light detector (not shown) of the OPU 121. The light detector of the OPU 121 generates an electrical signal, generally in the analog form, in response to the reflected laser beam. The electrical signal is then processed by other components of the optical drive module 120, such as the read channel 130, to reproduce the information stored on the optical disc 119.

The read channel 130 includes a signal processing circuit (not shown). The signal processing circuit receives the electrical signal and processes the electrical signal. The electrical signal may have a profile that varies due to various reasons. In an example, a profile of the electrical signal includes an offset and an amplitude. The offset and the amplitude vary due to various reasons, such as a power variation of the laser beam, a reflectivity variation of the optical disc 119, and the like. Generally, the read channel 130 includes an offset control portion, such as an offset control loop, and a gain control portion, such as a gain control loop, that adaptively adjust parameters in the signal processing circuit, such that the offset and the amplitude of the processed electrical signal are maintained at a desired level(s).

In an example, the offset control loop adaptively adjusts an offset adjustment added to the electrical signal to compensate for the offset variation, such that the offset of the adjusted electrical signal is maintained at a desired level, such as at about zero. The gain control loop adaptively adjusts a gain of an amplifier that is used to amplify the electrical signal to compensate for the amplitude variation, such that the amplitude of the amplified electrical signal is maintained at a desired level.

It is noted that the offset and the amplitude of the electrical signal are not necessarily maintained at relatively constant values. Instead, the offset and the amplitude of the electrical signal are maintained at desired levels, such as within a range, and the like.

According to an embodiment of the disclosure, the read channel 130 is configured to have a relatively small response time, which is referred to as zero-start, in response to sudden profile changes. In an example, the read channel 130 includes a zero-start module (not shown) that compensates the sudden profile changes in the electrical signal with substantially instantaneous response, such that the processed electrical signal maintains a desired profile in response to the sudden profile changes. Specifically, the zero-start module detects a sudden profile change, and adds compensation as a function of the profile change in the signal processing circuit, such that the processed electrical signal has a desired profile in response to the sudden profile change. The signal processing circuit does not need to adaptively adjust parameters to compensate the sudden profile change, thus the response time to the sudden profile change is relatively small.

In an example, small loop gains are preferred for an offset control loop and a gain control loop in the read channel 130 to reduce channel noise. The small loop gains can result in a relatively slow response to sudden profile changes in the electrical signal, such as field changes of the laser beam position on the optical disc 119.

In a DVD-RAM example, a recording track includes multiple sectors. Each sector includes various fields, such as header fields, mirror fields, recordable fields, and the like. The various fields are configured differently, and reflect the laser beam with different light properties. Thus, when the laser beam traces the recording track, the electrical signal generated by the OPU 121 in response to the reflected laser beam can have sudden profile changes due to the field changes of the laser beam position.

Specifically, a header field includes a header1&2 field and a header3&4 field. The header1&2 field records header-1 and header-2, and the header3&4 field records header-3 and header-4. In an example, header-1 and header-2 are recorded as marks at positions that are shifted from a center of the recording track in an outer radial direction, and header-3 and header-4 are recorded as marks at positions that are shifted from the center of the recording track in an inner radial direction. The mirror fields have no marks. The recordable fields are configured to record data as marks at the center of the recording track. Because different fields have different configurations for marks, the different fields reflect the laser beam with different light properties. Thus, the electrical signal generated in response to the reflected laser beam has profile changes when the laser beam traces different fields on the recording track, such as from a recordable field to a header1&2 field, from a header1&2 field to a header3&4 field, from a header3&4 field to a mirror field, and the like.

In an embodiment, the zero-start module detects or predicts field changes from data format information obtained from the electrical signal. In an example, the read channel 130 or another read channel in the optical drive module 120 includes a sequencer that tracks a field sequence of the laser beam position on the optical disc 119 from data format and/or communication protocol read from the optical disc 119. When a field change is detected, the zero-start module adds an offset compensation in the offset control portion as a function of an offset change due to the field change. Further, the zero-start module adds a gain compensation in the gain control portion as a function of an amplitude change due to the field change. It is noted that the offset compensation and the gain compensation are directly added in the offset control portion and the gain control portion without adaptively adjusting circuit parameters, thus a time duration to obtain stable offset and amplitude is relatively small.

Other components of the medium system 100 also perform various functions during operation. The processor 111 executes system and application codes. The non-volatile memory 113 holds information even when power is off. The non-volatile memory 113 can be used to store system and application codes, such as firmware. The RAM 112 is readable and writeable. Generally, the RAM 112 can have a relatively fast access speed. In an embodiment, the data and the codes are stored in the RAM 112 during operation, such that the processor 111 can access the RAM 112 for the codes and the data instead of the non-volatile memory 113.

It should be understood that the medium system 100 can include more than one processor 111. Further, the non-volatile memory 113 can include various non-volatile memory devices, such as battery backup RAM, read-only memory (ROM), programmable ROM (PROM), flash PROM, electrical erasable PROM (EEPROM), magnetic storage, optical storage, and the like. Some non-volatile memory 113 can be updated, such as various types of PROM. The RAM 112 may also include various RAM devices, such as dynamic RAM (DRAM), static RAM (SRAM), and the like.

It is noted that the medium system 100 can include other suitable modules. In an example, the medium system 100 includes a user input module 115. The user input module 115 enables a user to control operations of the medium system 100. The user input module 115 includes any suitable user input device, such as a keyboard, mouse, touch screen, and the like. In addition, the user input module 115 can include an interface that couples external user input devices to the medium system 100.

In another example, the medium system 100 includes an audio/video (A/V) module 114. The audio/video module 114 includes any suitable audio/video device, such as a microphone, speaker, display screen, and the like. In addition, the audio/video module 114 can include an interface that couples external audio and video devices to the medium system 100. The audio/video module 114 can be utilized to play audio/video data stored in the optical disc 119.

In another example, the medium system 100 includes communication modules, such as a network module 116, a wireless communication module 117, and the like. The network module 116 and the wireless communication module 117 enable the medium system 100 to transmit the data stored on the optical disc 119 to other devices, or to store data received from the other devices onto the optical disc 119.

For ease and clarity of description, the embodiments are presented with a bus architecture. However, it should be understood that any other architectures can be used to couple components within the medium system 100.

It is noted that the read channel 130 can be suitably implemented in other medium system that reads other suitable storage medium, such as holographic optical disc, magnetic storage, and the like.

Figure 2A:
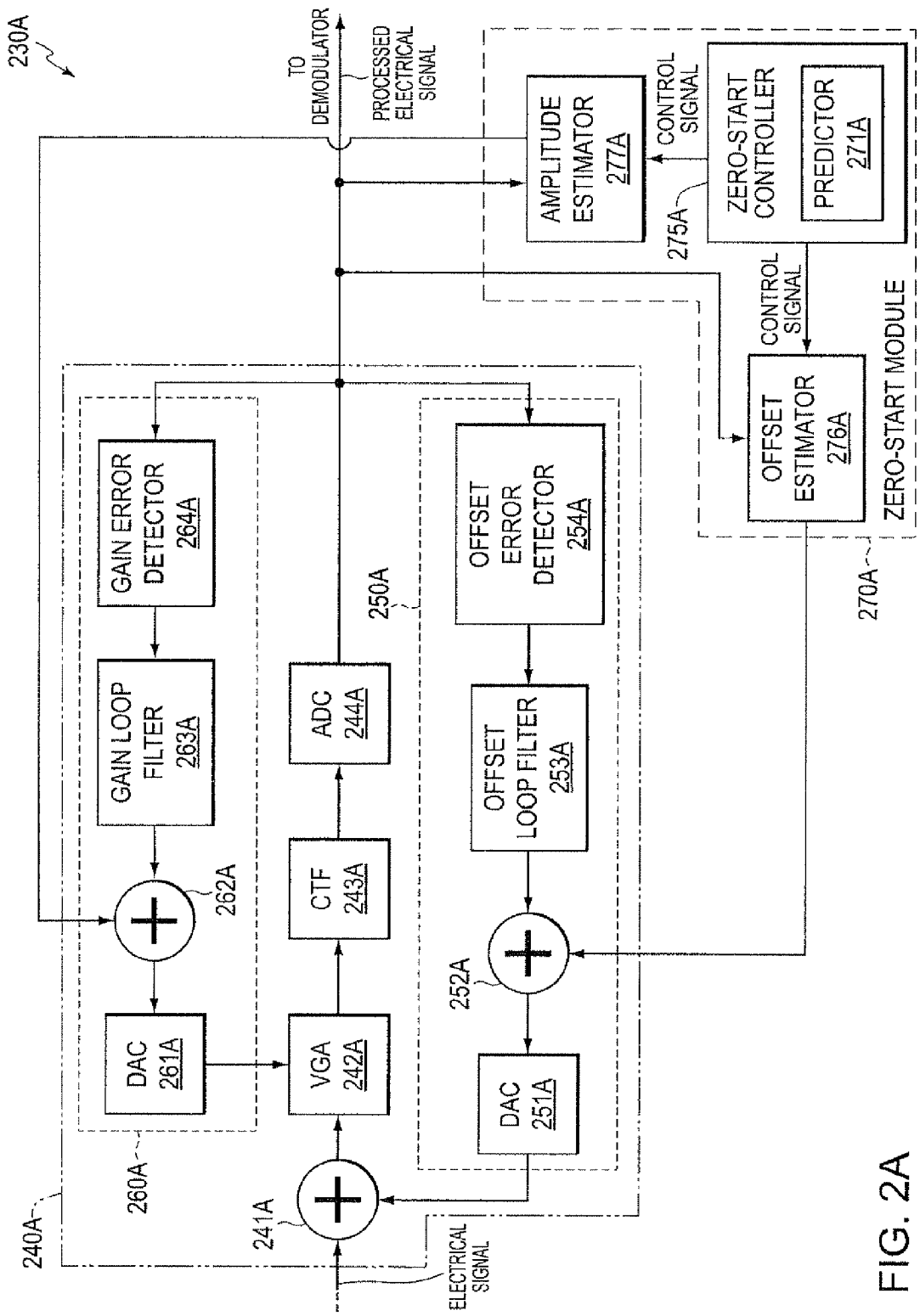
FIGS. 2A-2C show block diagrams of read channel examples.

FIG. 2A shows a block diagram of a read channel example 230A according to an embodiment of the disclosure. The read channel 230A includes a processing path 240A and a zero-start module 270A. The processing path 240A receives an electrical signal, processes the electrical signal to facilitate further processing, and provides the processed electrical signal to a downstream processing portion for further processing. The zero-start module 270A detects a field change, and adds compensation in the processing path 240A as a function of a profile change of the electrical signal due to the field change. The processing path 240A and the zero-start module 270A are coupled together as shown in FIG. 2A.

The processing path 240A receives the electrical signal and regulates the electrical signal using various techniques, such as amplification, offset adjustment, filtering, sampling, analog to digital converting, and the like. In an example, the processing path 240A includes a processing portion, such as a first adder 241A, a variable gain amplifier (VGA) 242A, a continuous time filter (CTF) 243A, and an analog to digital converter (ADC) 244A, for processing the electrical signal. Specifically, the first adder 241A receives the electrical signal, combines an offset adjustment with the electrical signal to adjust an offset of the electrical signal, and provides the offset-adjusted electrical signal to the VGA 242A. The VGA 242A amplifies the electrical signal with a gain that is adjustable, and provides the amplified electrical signal to the CTF 243A. The CTF 243A filters the amplified electrical signal to remove high frequency noise to clean the electrical signal, and provides the filtered electrical signal to ADC 244A. The ADC 244A samples the electrical signal, converts the samples of the electrical signal from an analog form to a digital form, and provides digital samples to the downstream processing portion, such as a demodulator, and the like, for further processing. In an example, the further processing includes obtaining a binary stream from the digital samples and detecting data formats from the binary stream. In another example, detecting data format is performed by another read channel.

Further, the processing path 240A includes an offset control portion 250A and a gain control portion 260A. The offset control portion 250A provides the offset adjustment to the first adder 241A to adjust the offset of the electrical signal, and the gain control portion 260A controls the gain of the VGA 242A in order to adjust an amplitude of the electrical signal.

In an example, the offset control portion 250A is coupled to the processing portion to form an offset control loop. In the FIG. 2A example, the offset control portion 250A includes an offset error detector 254A, an offset loop filter 253A, a second adder 252A, and a first digital to analog converter (DAC) 251A. These elements are coupled together and are coupled with the processing portion to form an offset control loop as shown in FIG. 2A. Specifically, the offset error detector 254A receives the digital samples output from the ADC 244A, detects an offset error based on the digital samples, and provides the detected offset error to the offset loop filter 253A. The offset loop filter removes high frequency noises in the detected offset error to generate a filtered offset error. The second adder 252A combines the filtered offset error with an offset compensation that compensates for sudden changes in the electrical signal to generate an offset adjustment. The combined offset adjustment is converted from a digital form to an analog form by the first DAC 251A. The first DAC 251A provides the offset adjustment to the first adder 241A to adjust the offset of the electrical signal.

Similarly, in an example, the gain control portion 260A is coupled with the processing portion to form a gain control loop. In the FIG. 2A example, the gain control portion 260A includes a gain error detector 264A, a gain loop filter 263A, a third adder 262A, and a second digital to analog converter (DAC) 261A. These elements are coupled together and are coupled with the processing portion to form a gain control loop as shown in FIG. 2A. Specifically, the gain error detector 264A receives the digital samples output from the ADC 244A, detects a gain error based on the digital samples, and provides the detected gain error to the gain loop filter 263A. The gain loop filter removes high frequency noises to generate a gain control. The third adder 262A combines the gain control with a gain compensation that compensates for sudden amplitude changes in the electrical signal. The compensated gain control is converted from a digital form to an analog form by the second DAC 261A. The second DAC 261A provides the analog gain control to adjust the gain of the VGA 242A.

Generally, the offset control loop and the gain control loop adaptively compensate for offset changes and amplitude changes in the electrical signal. The response time to obtain stabilized offset and amplitude by the offset control loop and the gain control loop depends on loop gains. In an embodiment, the offset control loop and the gain control loop are configured to have relatively small loop gains in order to reduce channel noise. The small loop gains can result in a relatively slow response by the offset control loop and the gain control loop to a sudden profile change, such as a profile change corresponding to a field change of laser beam position.

In the FIG. 2A example, the offset compensation and the gain compensation in response to a sudden profile change are directly combined into the offset control loop and the gain control loop without being adaptively compensated by the offset control loop and the gain control loop. Thus, a relatively short response time to the sudden profile change is achieved without using relatively large loop gains.

In an embodiment, the zero-start module 270A includes a zero-start controller 275A, an offset estimator 276A and an amplitude estimator 277A. These elements are coupled together as shown in FIG. 2A. During operation, for example, the zero-start controller 275A detects sudden profile changes of the electrical signal, such as a sudden profile change due to a field change of a laser beam position on an optical disc, and provides control signals to the offset estimator 276A and the amplitude estimator 277A to determine the offset compensation, and the gain compensation to compensate for the sudden profile change. In an embodiment, the zero-start controller 275A includes a predictor 271A that predicts the field change based on data format obtained from the electrical signal. For example, when a sector end is detected based on the data format, the predictor 271A predicts a field change from a recordable field to a header1&2 field. The field change results in a sudden profile change in the electrical signal. In another example, when an end of a header1&2 field is detected based on the data format, the predictor 271A predicts a field change from the header1&2 field to a header3&4 field. In another example, when an end of a header3&4 field is detected based on the data format, the predictor 271A predicts a field change from the header3&4 to a recordable field.

The offset estimator 276A determines an offset compensation to compensate for a sudden offset change due to a field change. In an embodiment, when the offset estimator 276A receives a control signal from the zero-start controller 275A that indicates a field change, the offset estimator 276A calculates an average of a number of digital samples from the ADC 244A, such as the last 16 digital samples from the ADC 244A. Then, the offset estimator 276A determines the offset compensation based on the average. In another embodiment, when the offset estimator 276A receives a control signal from the zero-start controller 275A that indicates a field change, the offset estimator 276A detects an envelope for the digital samples from the ADC 244A. Then, the offset estimator 276A determines the offset compensation based on the envelope.

It is noted that the ADC 244A can be saturated due to a relatively large offset. When the ADC 244A is saturated, the offset and the envelope obtained from the ADC samples are limited, for example, by a maximum value or a minimum value of the ADC 244A. In an embodiment, when the ADC 244A is not saturated, the offset estimator 276A determines the offset compensation based on the average or the envelope according to a linear relationship; but when the ADC 244A is saturated, the offset estimator 276A determines the offset compensation based on the average or the envelope according to a non-linear relationship. In an example, the offset estimator 276A includes a look-up table (LUT) to store a conversion relationship between the offset compensation and the average or the envelope, and uses the LUT to convert the average or the envelope to the offset compensation.

According to another aspect, the offset compensation can be suitably scaled, for example, by an inverse of an overall-offset-loop gain. In the FIG. 2A example, the overall-offset-loop gain is a product of gains of the first DAC 251A, the VGA 242A, the CTF 243A, and the ADC 244A.

The amplitude estimator 277A determines a gain compensation to compensate for a sudden amplitude change due to a field change. In an embodiment, after the offset compensation has been added into the offset control portion 250A, the zero-start controller 275A provides a control signal to the amplitude estimator 277A to determine the gain compensation. When the amplitude estimator 277A receives the control signal, the amplitude estimator 277A estimates an amplitude of the digital samples from the ADC 244A. Various techniques can be used to estimate the amplitude of the digital samples. In an example, the amplitude estimator 277A includes an envelope detector to detect an envelope for the digital samples. In another example, the amplitude estimator 277A measures a root-mean-square (RMS) of the digital samples. In another example, the amplitude estimator 277A includes a Digital Fourier Transform (DFT) module that calculates an amplitude of a sinusoidal portion of the electrical signal, such as when the electrical signal corresponds to a variable frequency oscillator (VFO) field on a DVD-RAM.

Then, the amplitude estimator 277A determines the gain compensation for the gain control based on the estimated amplitude. In an example, the amplitude estimator 277A subtracts the estimated amplitude from a gain set point corresponding to a desired amplitude to obtain the gain compensation. The gain compensation is then suitably combined with the output of the gain loop filter 263A.

It is noted that the read channel 230A can be suitably modified. For example, blocks having similar functions can be suitably combined.

Figure 2B:
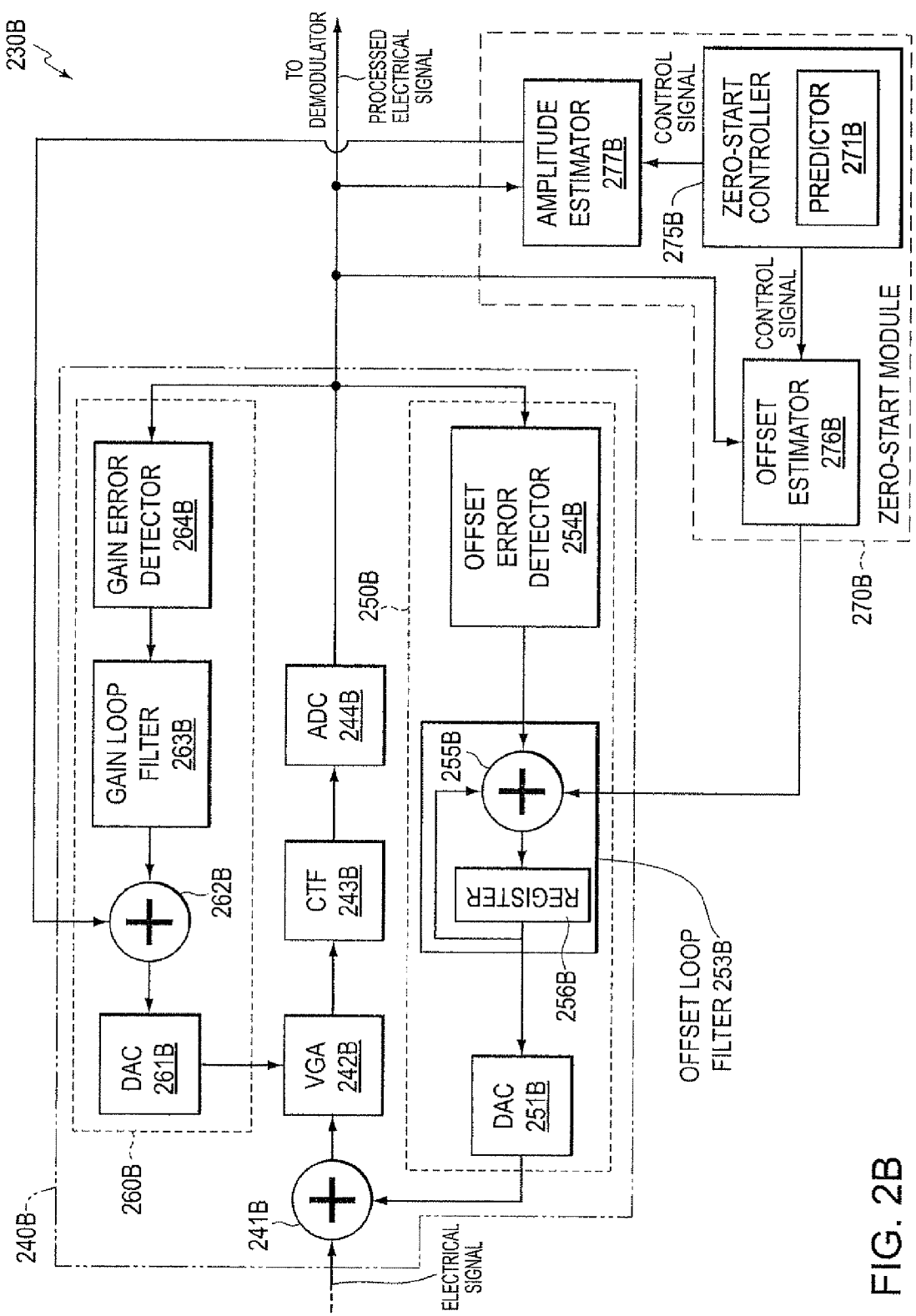

FIG. 2B shows a block diagram of another read channel example 230B according to an embodiment of the disclosure. The read channel 230B operates similarly to the read channel 230A described above. The read channel 230B also utilizes certain components that are identical or equivalent to those used in the read channel 230A; the description of these components has been provided above and will be omitted here for clarity purposes. However, in this embodiment, the read channel 230B does not include a second adder that is used for combining the offset compensation in the offset adjustment. Instead, the offset compensation is suitably added in the offset control portion 250B via a loop filter adder 255B within the offset loop filter 253B.

In the FIG. 2B example, the offset loop filter 253B includes the loop filter adder 255B and a register 256B. The loop-filter adder 255B combines a detected offset error with a previous offset adjustment to generate a current offset adjustment. The register 256B can be configured to buffer the current offset adjustment, and hold the previous offset adjustment. In addition, the loop filter adder 255B is suitably configured to combine the offset compensation in response to the sudden profile change into the current offset adjustment.

Figure 2C:
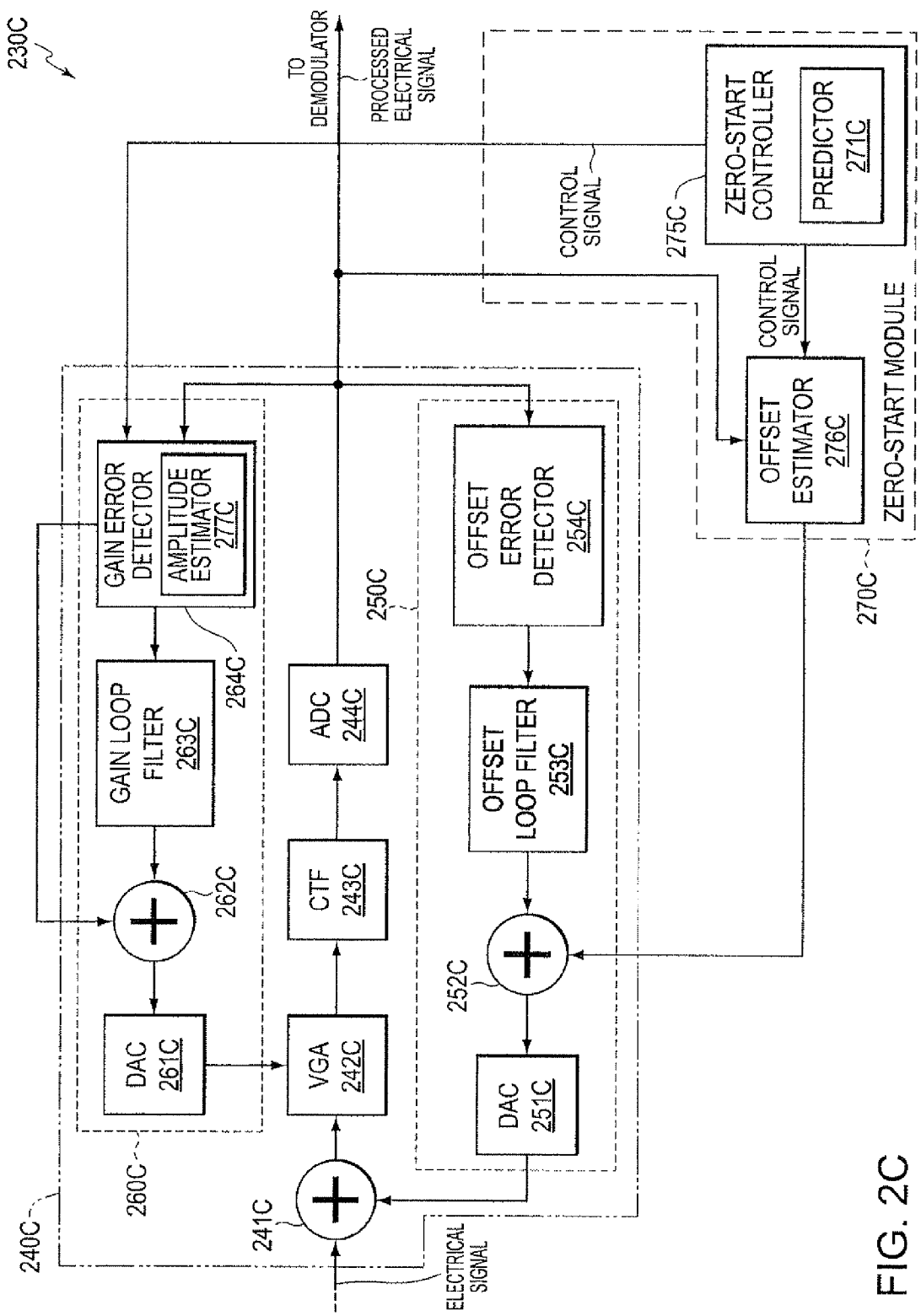

FIG. 2C shows a block diagram of another read channel example 230C according to an embodiment of the disclosure. The read channel 230C operates similarly to the read channel 230A described above. The read channel 230C also utilizes certain components that are identical or equivalent to those used in the read channel 230A; the description of these components has been provided above and will be omitted here for clarity purposes. However, in this embodiment, the zero-start module 270C does not include an amplitude estimator. Instead, the functions of the amplitude estimator are suitably combined into the gain error detector 264C.

Figure 3:
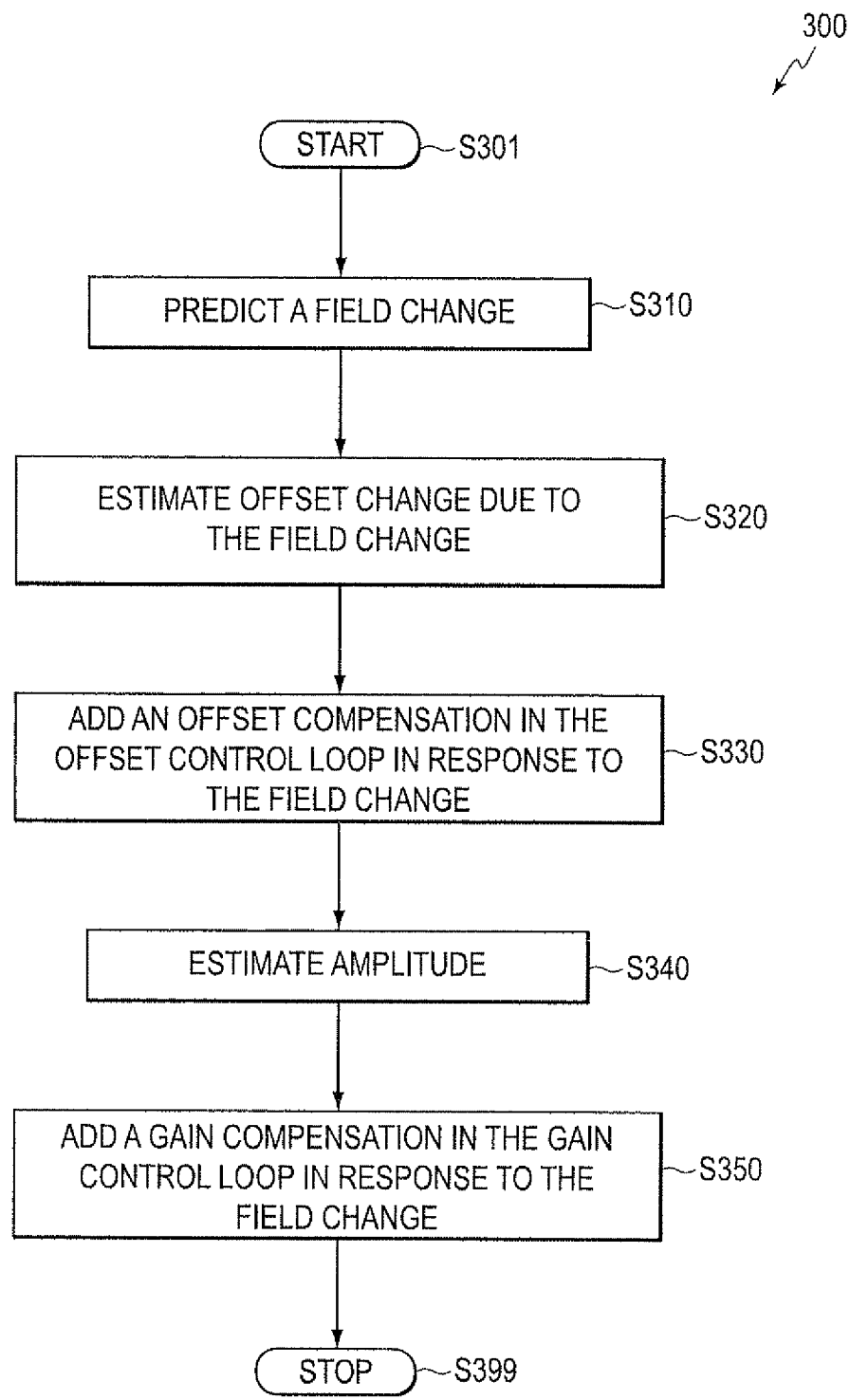
FIG. 3 shows a flowchart outlining a process example 300 according to an embodiment of the disclosure.

FIG. 3 shows a flowchart outlining a process example 300 for compensating sudden profile changes with zero-start according to an embodiment of the disclosure. The process 300 can be executed by a zero-start module, such as the zero-start module 270A in FIG. 2A, to compensate for a sudden profile change in an electrical signal. In an example, the electrical signal is generated corresponding to a reflected laser beam from an optical disc. The electrical signal has sudden profile changes due to field changes of the laser beam position on the optical disc. The electrical signal is processed by a processing path, such as the processing path 240A. The processing path has an offset control portion, such as an offset control loop, and a gain control portion, such as a gain control loop. The offset control loop and the gain control loop adaptively compensate for changes in the offset and amplitude of the electrical signal. The zero-start module is coupled to the processing path to directly introduce compensation in response to the sudden profile change. Thus, a response time to the sudden profile change is reduced compared to adaptive compensation by the offset control portion and the gain control portion. The process starts from S301, and proceeds to S310.

At S310, the zero-start module predicts a field change. In an example, the zero-start module uses information from a sequencer to predict the field change. The sequencer is configured to obtain a field sequence from data format of data read from the optical disc. Based on the field sequence, the zero-start module predicts or detects a field change that can result in a sudden profile change in the electrical signal, such as a sudden offset change, a sudden amplitude change, and the like.

At S320, the zero-start module estimates an offset change due to the field change. In an embodiment, substantially zero offset is preferred for stabilized signal processing. When the field change happens, the offset is shifted from zero. The zero-start module includes an offset estimator to estimate the offset of the electrical signal due to the field change. In an example, the zero-start module calculates an average of digital samples of the electrical signal, and converts the average of digital samples to the offset based on a LUT that is used to compensate for saturations during analog to digital conversion.

At S330, the zero-start module combines an offset compensation in the offset control loop of the processing path in response to the field change. In an embodiment, the zero-start module determines the offset compensation based on the offset change. In an example, the zero-start module scales the offset change, for example, by an inverse of an offset loop gain, to obtain the offset compensation. In another embodiment, the zero-start module includes a memory module that stores an offset compensation corresponding to the detected field change. In another example, the offset compensation is determined based on previously conducted calibration, experiment or simulation.

At S340, the zero-start module estimates an amplitude change due to the field change. In an embodiment, the zero-start module estimates the amplitude change after the offset compensation has been added in the offset control loop to avoid possible saturation.

At S350, the zero-start module adds a gain compensation in the gain control loop in response to the field change. The gain compensation is suitably determined based on the amplitude change. Then, the process proceeds to S399 and terminates.

Figure 4A:
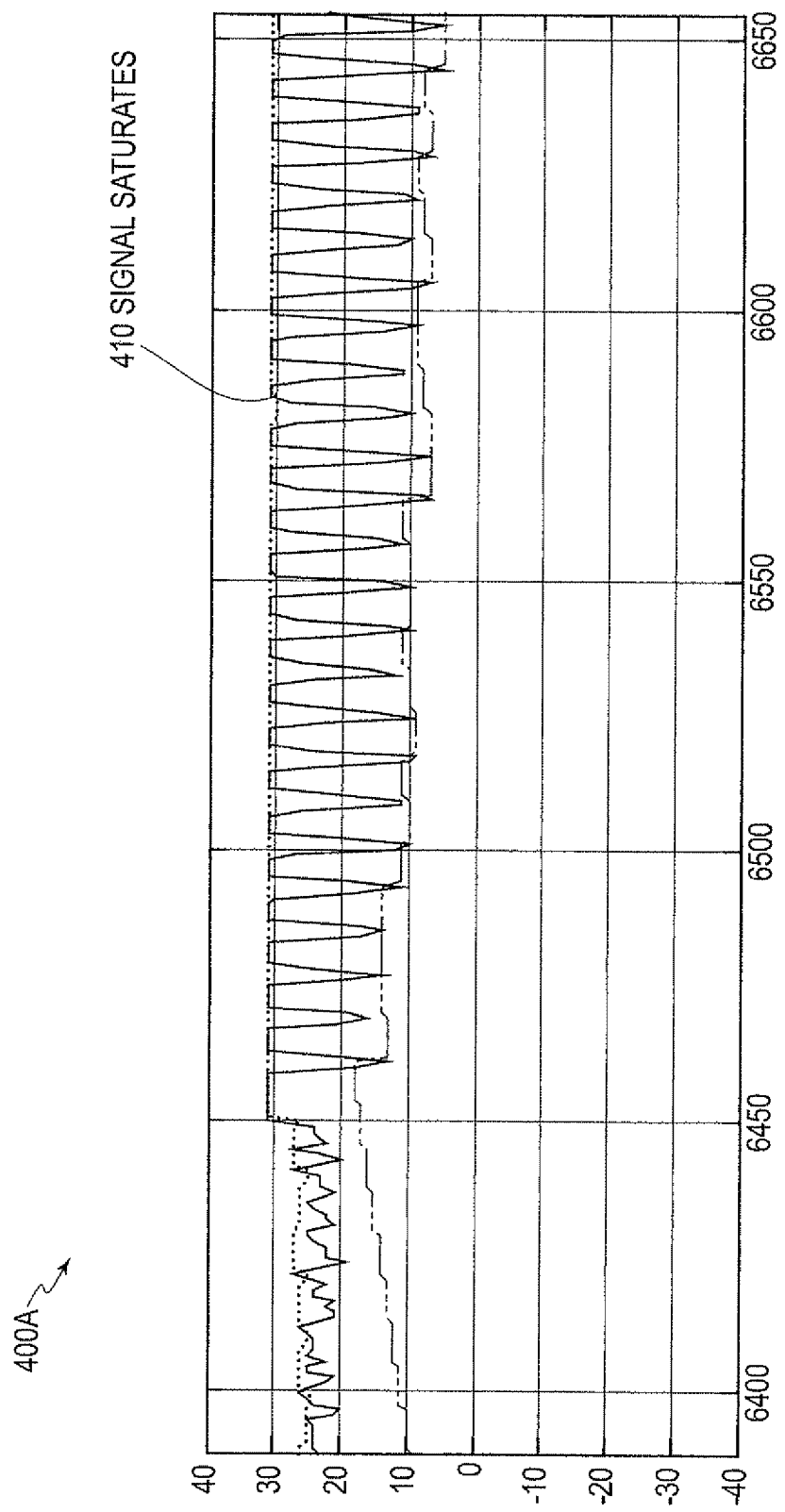
FIGS. 4A-4C show an example to estimate an offset of an electrical signal according to an embodiment of the disclosure.
Figure 4B:
Figure 4C:
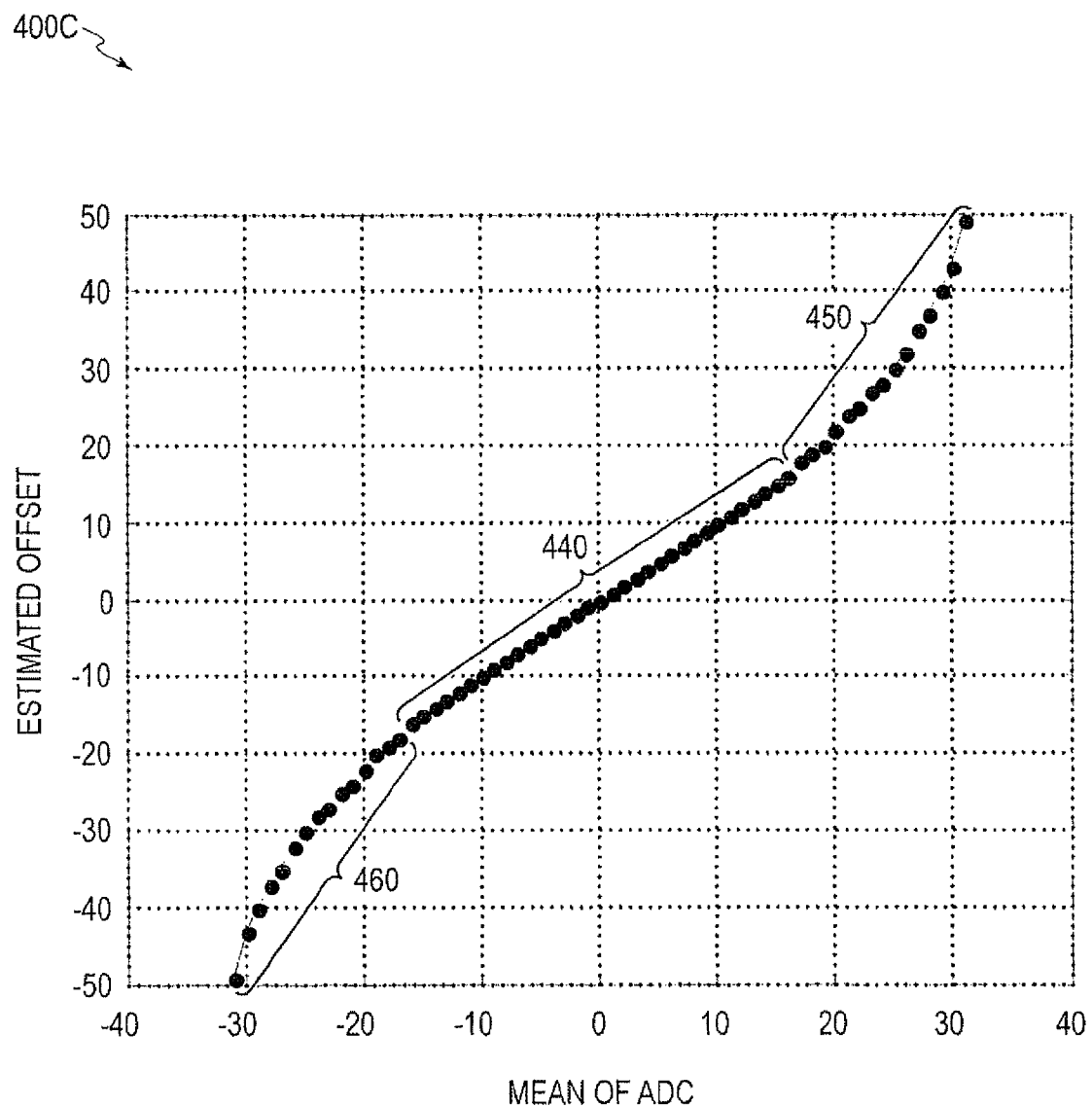

FIGS. 4A-4C show an example to estimate an offset of an electrical signal, such as the electrical signal from the OPU 121, according to an embodiment of the disclosure. FIG. 4A shows a plot 400A for the electrical signal after an ADC module converts the electrical signal from an analog form to a digital form. The plot 400A includes a curve 410 tracing digital samples of the processed electrical signal. When the electrical signal has a relatively large offset, some digital samples of the processed electrical signal are saturated having a maximum value of the ADC, such as 31 in FIG. 4A.

FIG. 4B shows a look-up table 400B. The 400B includes a first field 420 and a second field 430. For each table entry (row), the first field 420 stores a mean of digital samples from the ADC, and the second field 430 stores an offset by estimation corresponding to the mean of digital samples.

FIG. 4C shows a plot 400C corresponding to the look-up table 400B. The X-axis corresponds to the first field 420 that is the mean of digital samples from the ADC, and the Y-axis corresponds to the second field 430 that is the estimated offset. When the electrical signal does not saturate the ADC, the relationship between the estimated offset and the mean of digital samples is linear, as shown by 440. When the electrical signal saturates the ADC, the digital samples are limited by a maximum value or a minimum of the ADC, such as ±31 in the FIG. 4C. The loop-up table 400B uses a non-linear relationship, as shown by 450 and 460 in FIG. 4C, to estimate the offset based on the mean of digital samples.

FIGS. 5A-5D show signal waveform examples according to an embodiment of the disclosure.

Figure 5A:
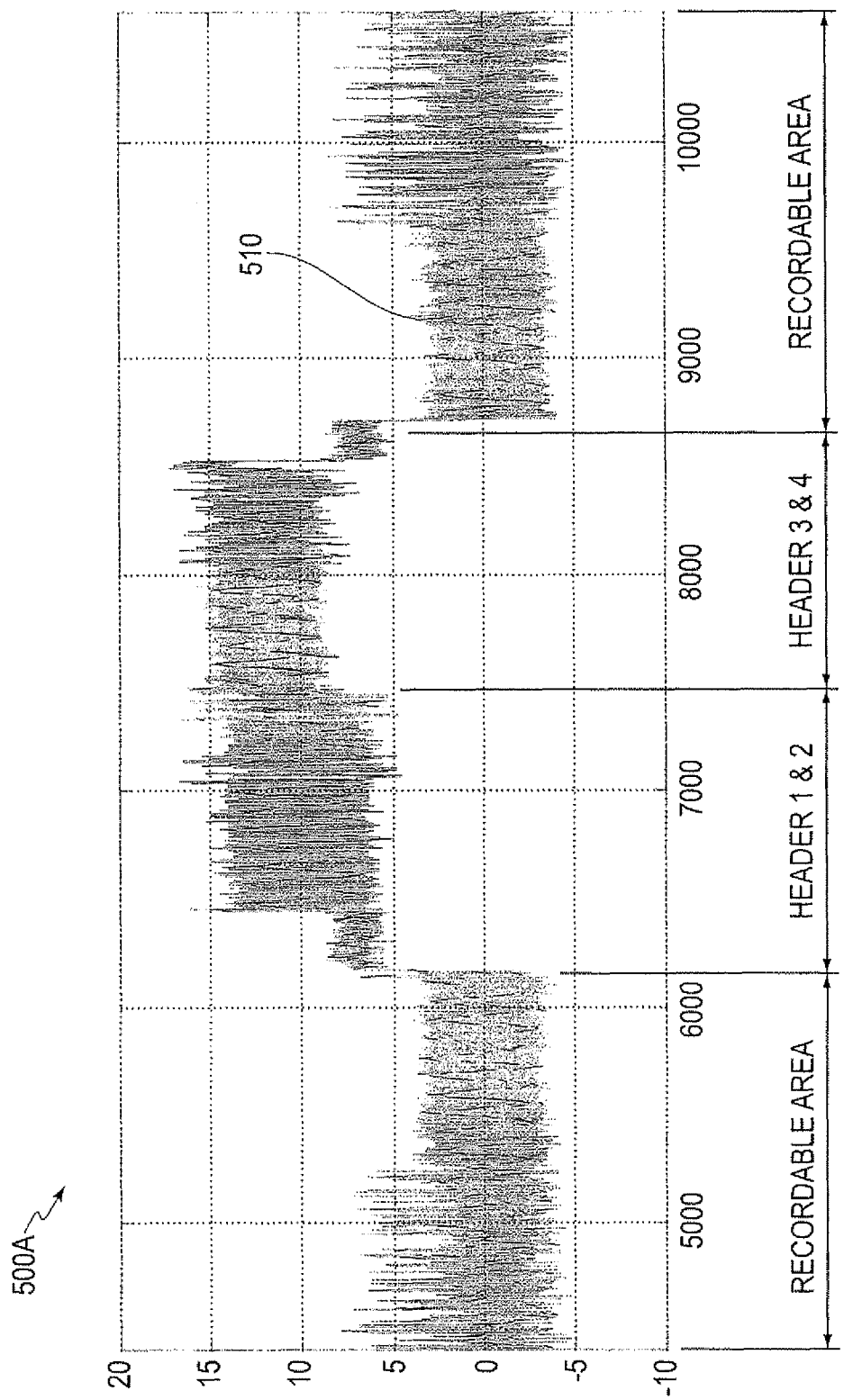
FIGS. 5A-5D show signal waveform examples according to an embodiment of the disclosure.

FIG. 5A shows a curve 510 of a received electrical signal before being processed. The electrical signal is generated in response to a reflected laser beam from a recording track on an optical disc. The recording track includes different fields, such as recordable fields, header1&2 fields, header3&4 fields, and the like. Different fields reflect the laser beam with different light properties, and result, in different profiles of the electrical signal. In the FIG. 5A example, the curve 510 has different profiles, such as different offsets and different amplitudes, corresponding to different fields.

Figure 5B:
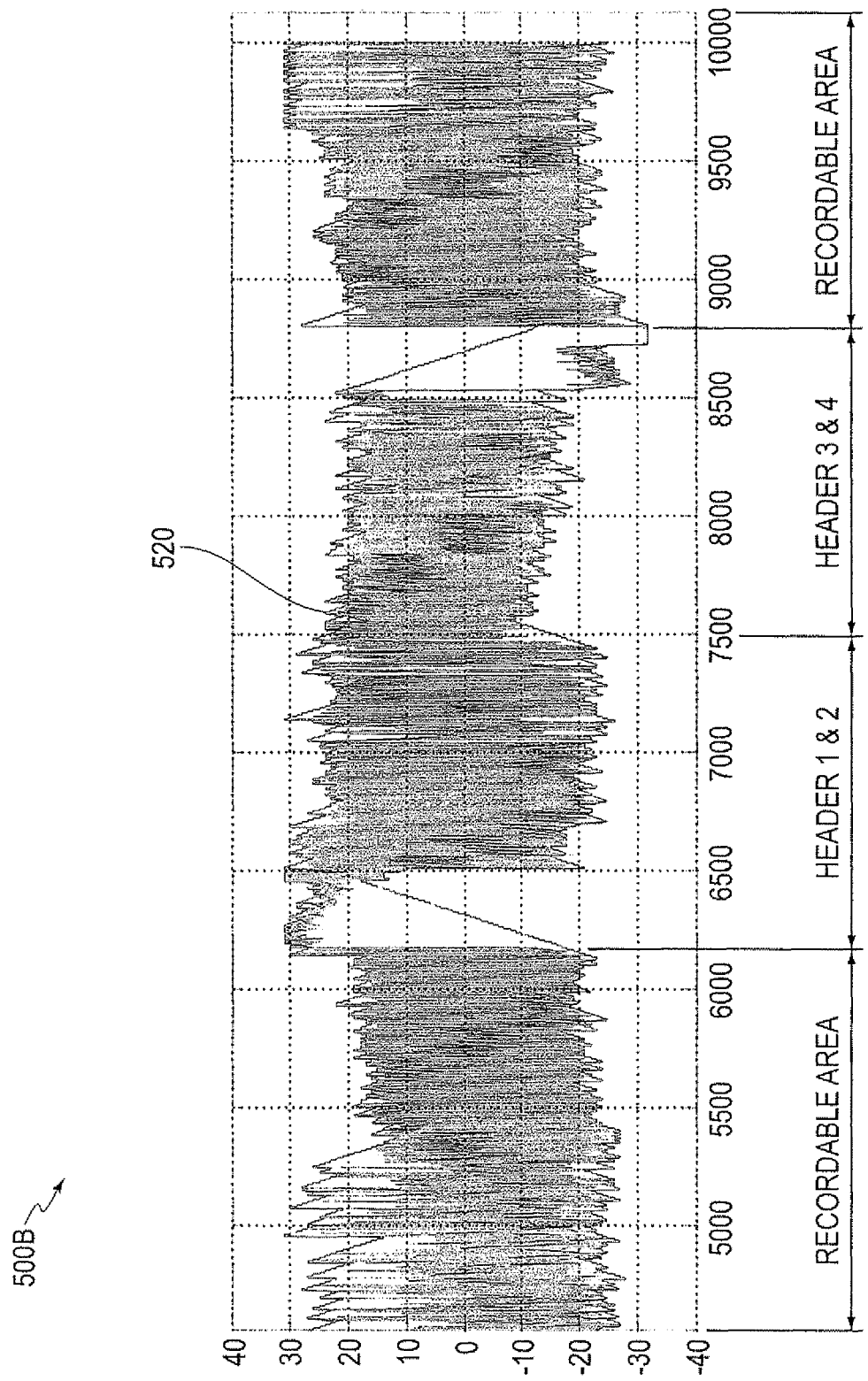

FIG. 5B shows a curve 520 tracing digital samples of a processed electrical signal by a read channel according to an embodiment of the disclosure, such as one of the read channels 230A-C. The read channel has relatively small loop gains for an offset control loop and a gain control loop. Thus, the read channel has a relatively small channel noise. In addition, the read channel has a zero-start module to directly introduce compensation in the offset control loop and the gain control loop in response to field changes. Thus, a response time to the field changes is reduced comparing to adaptive compensation by the offset control loop and the gain control loop.

In FIG. 5B, the curve 520 has substantially same offset and amplitude corresponding to different fields on an optical disc, such as recordable field, header1&2 field, and header3&4 field. In addition, the substantially same offset and the amplitude can be achieved in a relatively short time when a field change happens.

Figure 5C:
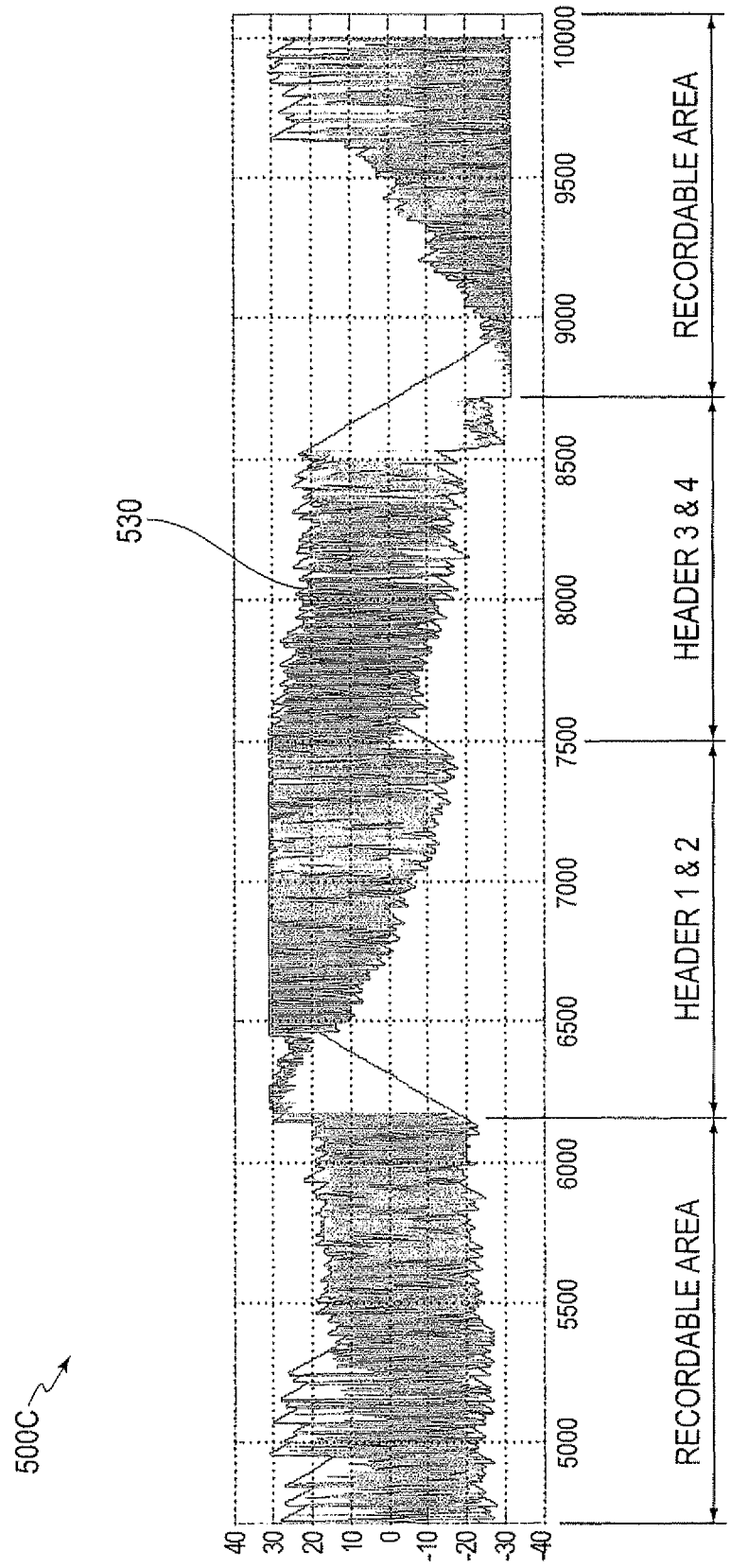

FIG. 5C shows a curve 530 tracing digital samples of a processed electrical signal by a first comparison read channel. The first comparison read channel has relatively small loop gains for an offset control loop and a gain control loop. Thus, the read channel has a relatively small channel noise. However, due to the small loop gains, the first comparison read channel takes a relatively long time to adaptively compensate for offset change and amplitude change due to the field changes.

Figure 5D:
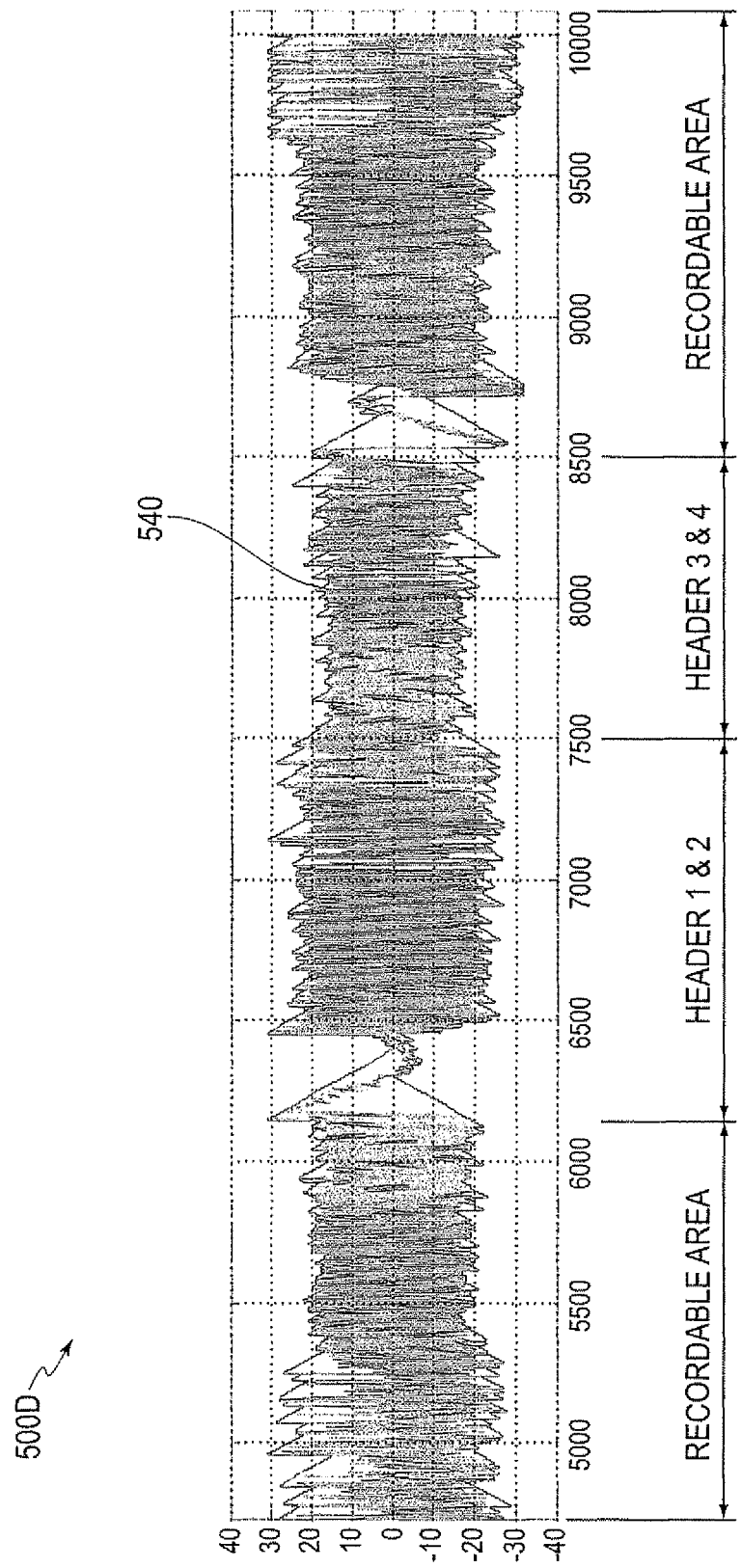

FIG. 5D shows a curve 540 tracing digital samples of a processed electrical signal by a second comparison read channel. The second comparison read channel has relatively large loop gains for an offset control loop and a gain control loop. The second comparison read channel takes a relatively short time to adaptively compensate for offset change and amplitude change due to the field change. However, the second comparison read channel has a relatively large channel noise due to the relatively large loop gains.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A signal processing circuit, comprising:
    a processing path configured to process an electrical signal that is generated in response to reading data on a storage medium, the data including at least a first data field and a second data field, the first data field and the second data field defined according to data format of the data, the electrical signal having a first profile corresponding to the first data field and having a second profile corresponding to the second data field; and
    a zero-start module configured to predict that a field change from the first data field to the second data field is doing to occur, and control the processing path to introduce a compensation as a function of a profile change from the first profile to the second profile to keep the processed electrical signal to have a predetermined profile in response to the predicted field change.

2. The signal processing circuit of claim 1, wherein
    the processing path comprises an offset control loop configured to adjust an offset of the processed electrical signal in a feedback loop manner; and
    the zero-start module is configured to control the offset control loop to introduce an offset compensation in response to the predicted field change as a function of an offset change from the first profile to the second profile.

3. The signal processing circuit of claim 2, wherein the zero-start module further comprises:
    an offset estimator configured to estimate the offset change based on at least one of an average and an envelope of the processed electrical signal in response to the field change, and determine the offset compensation as a function of the estimated offset change.

4. The signal processing circuit of claim 3, wherein the offset estimator further comprises:
    a look-up table configured to adjust the average and/or the envelope of the processed electrical signal to compensate for saturation in the processing path.

5. The signal processing circuit of claim 2, wherein
    the processing path comprises a gain control loop configured to adjust an amplitude of the processed electrical signal in a feedback loop manner; and
    the zero-start module is configured to control the gain control loop to introduce a gain compensation in response to the predicted field change as a function of an amplitude change from the first profile to the second profile.

6. The signal processing circuit of claim 5, wherein the zero-start module further comprises:
    an amplitude estimator configured to estimate an amplitude of the processed electrical signal after the offset compensation is introduced in the offset control loop, and determine the gain compensation as a function of the estimated amplitude.

7. The signal processing circuit of claim 1, wherein the zero-start module further comprises:
    a predictor configured to predict the field change based on a data format of the data read from the storage medium.

8. The signal processing circuit of claim 7, wherein the predictor is configured to predict the field change based on the data extracted from the processed electrical signal.

9. A method for signal processing, comprising:
    predicting that a field change of data read from a first data field to a second data field on a storage medium is going to occur, the first data field and the second data field defined according to data format of the data, the field change resulting in a profile change in an electrical signal that is generated in response to the reading; and
    introducing a compensation as a function of the profile change to keep the processed electrical signal to have a predetermined profile in response to the predicted field change.

10. The method of claim 9, wherein introducing the compensation as a function of the profile change to keep the processed electrical signal to have the predetermined profile in response to the predicted field change further comprises:
    introducing an offset compensation in an offset control loop for processing the electrical signal, the offset compensation being a function of an offset change in the electrical signal in response to the field change.

11. The method of claim 10, further comprising:
    estimating the offset change in response to the field change based on at least one of an average and an envelope of the processed electrical signal; and
    determining the offset compensation as a function of the estimated offset change.

12. The method of claim 11, further comprising:
    adjusting the average and/or the envelope of the processed electrical signal to compensate for saturation during the signal processing.

13. The method of claim 10, further comprising:
    introducing a gain compensation in a gain control loop for processing the electrical signal, the gain compensation being a function of an amplitude change of the electrical signal in response to the field change.

14. The method of claim 13, further comprising:
    estimating an amplitude of the processed electrical signal after the offset compensation is introduced in the offset control loop; and
    determining the gain compensation as a function of the estimated amplitude.

15. The method of claim 9, further comprising:
    predicting the field change based on a data format of the data read from the storage medium.

16. The method of claim 15, wherein predicting the field change based on the data format of the data read from the storage medium further comprises:
    predicting the field change based on the data extracted from the processed electrical signal.

17. An apparatus for accessing a storage medium, comprising:
    a pick-up unit configured to generate an electrical signal in response to reading data on the storage medium, the data including at least a first data field and a second data field, the first data field and the second data field defined according to data format of the data, the electrical signal having a first profile corresponding to the first data field and having a second profile corresponding to the second data field;

a processing path configured to process the electrical signal; and a zero-start module configured to predict that a field change from the first data field to the second data field is going to occur, and control the processing path to introduce a compensation as a function of a profile change from the first profile to the second profile to keep the processed electrical signal to have a predetermined profile in response to the predicted field change.

18. The apparatus of claim 17, wherein the processing path comprises an offset control loop configured to adjust an offset of the processed electrical signal in a feedback loop manner; and the zero-start module is configured to control the offset control loop to introduce an offset compensation in response to the predicted field change as a function of an offset change from the first profile to the second profile.

19. The apparatus of claim 18, wherein the processing path comprises a gain control loop configured to adjust an amplitude of the processed electrical signal in a feedback loop manner; and the zero-start module is configured to control the gain control loop to introduce a gain compensation in response to the predicted field change as a function of an amplitude change from the first profile to the second profile.

20. The apparatus of claim 17, wherein the zero-start module further comprises:

a predictor configured to predict the field change based on a data format of the data read from the storage medium.

* * * * *